A. GREEN.
LIFE SAVING APPARATUS.
APPLICATION FILED MAR. 28, 1912.
1,054,532.
Patented Feb. 25, 1913.
2 SHEETS—SHEET 1.
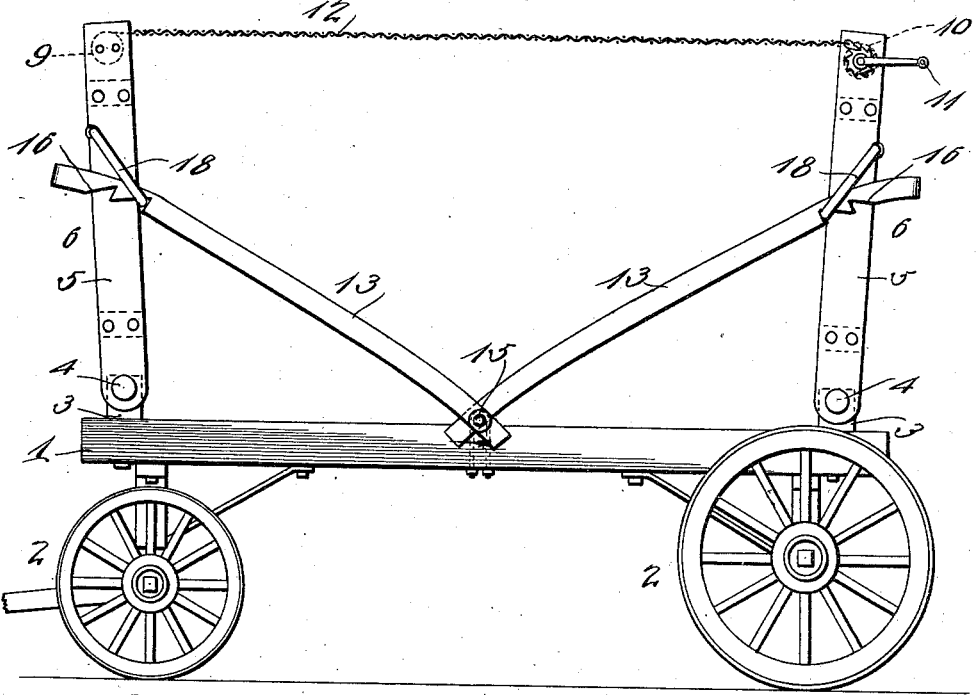
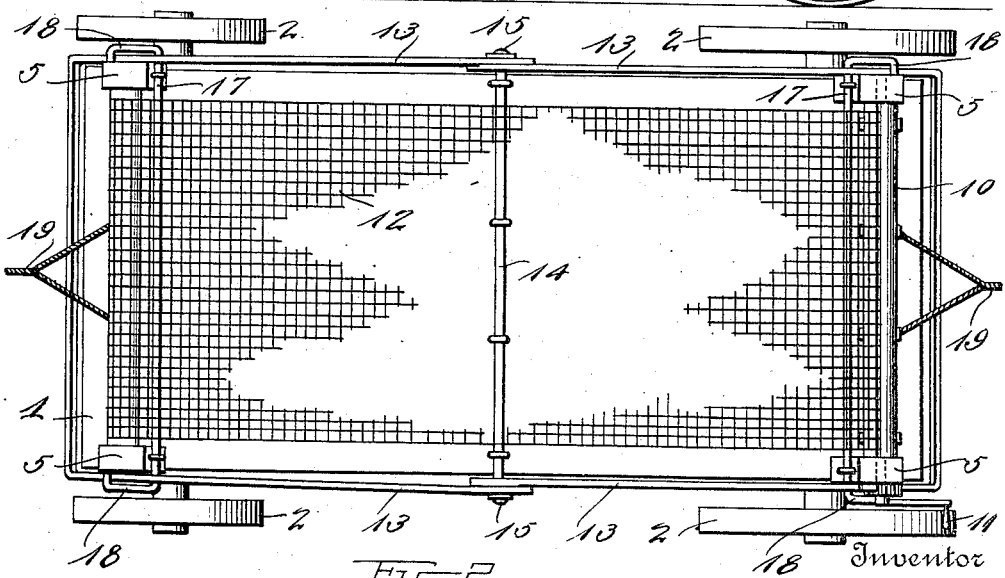

A. GREEN.
LIFE SAVING APPARATUS.
APPLICATION FILED MAR. 28, 1912.
1,054,532.
Patented Feb. 25, 1913.
2 SHEETS—SHEET 2.
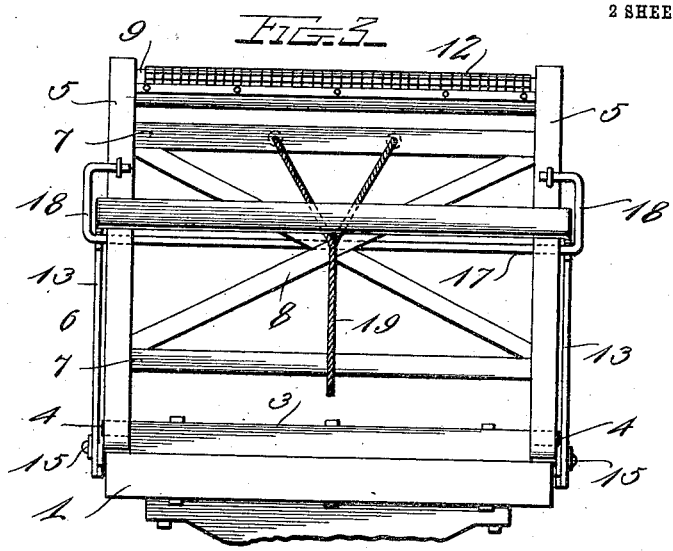
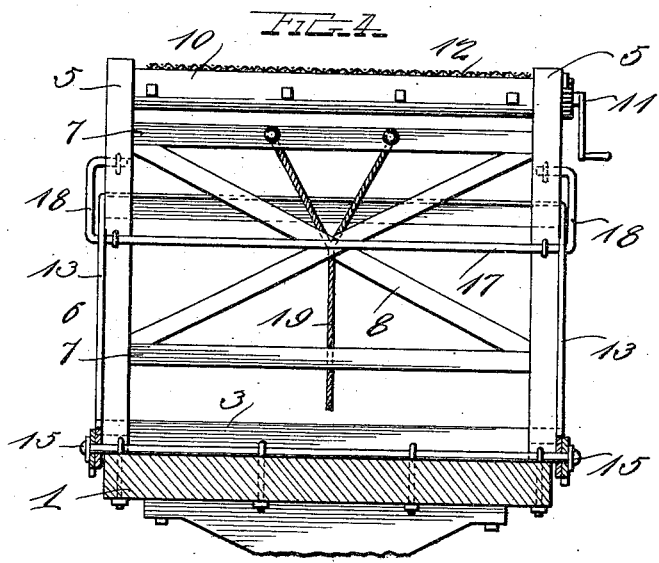
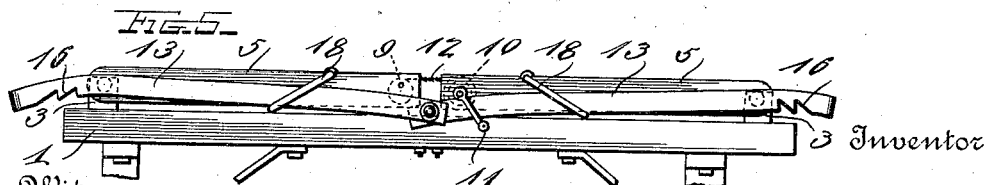

UNITED STATES PATENT OFFICE.

AUGUSTUS GREEN, OF GREER, SOUTH CAROLINA.

LIFE-SAVING APPARATUS.

1,054,532. Specification of Letters Patent. Patented Feb. 25, 1913.

Application filed March 28, 1912. Serial No. 686,925.

*To all whom it may concern:*

Be it known that I, AUGUSTUS GREEN, a citizen of the United States, residing at Greer, in the county of Greenville and State of South Carolina, have invented certain new and useful Improvements in Life-Saving Apparatus; and I do declare the following to be a full, clear, and exact description of the invention, such as will enable others skilled in the art to which it appertains to make and use the same.

This invention relates to improvements in life saving apparatus.

One object of the invention is to provide a life saving apparatus comprising a net having an improved supporting mechanism which when not in use may be folded into small compact form and which may be quickly and easily opened to support the net in an operative position.

Another object is to provide an improved construction and arrangement of braces for firmly holding the net supporting mechanism in operative position, and means whereby should the braces break, the net supporting mechanism may be manually held in position for supporting the net.

With these and other objects in view, the invention consists of certain novel features of construction, and the combination and arrangement of parts as will be more fully described and claimed.

In the accompanying drawings; Figure 1 is a side view of my improved life saving net showing the parts arranged in operative position; Fig. 2 is a top plan view thereof; Fig. 3 is an end view of one end of the apparatus; Fig. 4 is a central vertical cross sectional view thereof; Fig. 5 is a side view showing the parts folded.

My improved life saving apparatus comprises a platform 1 which is adapted to be applied to or may itself form the body or platform of a wheeled vehicle, the same being here shown as forming the platform of the vehicle and as supported by front and rear wheels 2. The vehicle may be drawn by horse power or may be in the form of a motor driven vehicle.

Arranged on the platform 1 near the front and rear ends thereof are hinge bars or cleats 3 having on their ends trunnions 4 to which are pivotally connected the lower ends of the side bars 5 of net supporting frames
6. The side bars 5 of the frames are connected near their ends by upper and lower cross bars 7 between which are arranged crossed diagonal brace bars 8. Between the projecting upper ends of the side bars of one of the frames 6 is secured a stationary net supporting roller 9 while between the projecting upper ends of the side bars of the other frame 6 is revolubly mounted a net supporting and winding roller 10. The roller 10 is provided on one end with a crank handle 11 whereby the roller is revolved to wind the net thereon. Connected at its ends to the rollers 9 and 10 and adapted to be wound on the latter is a life saving net 12, which when the frames are in an operative position will be stretched between the frames and above the platform in position to receive or catch any one falling or jumping from an elevation such as the upper windows or roof of a burning building, said net thus forming an effective means for catching the person thus falling or jumping, without injury.

In order to firmly hold the net supporting frame in an open or operative position, I provide braces 13 which are in the form of bale or yoke shaped frames of sufficient size to embrace or receive the frame 6 when swung to open positions. The side bars of the braces are pivotally engaged at their inner ends with the ends of a brace attaching rod 14 which is secured across the center of the platform 1 and has its ends projecting a suitable distance beyond the sides of the platform to receive the ends of the side bars of the braces. The ends of the side bars of the braces are held in operative engagement with the ends of the rods 14 by nuts 15 or other suitable fastening devices. In the lower edges of the side bars of the braces near the outer ends of the latter are formed series of notches 16 which are adapted to engage the ends of the latch members 17 arranged across and secured to the inner sides of the frames 6 above the center thereof as shown. The ends of the pawl or latch members 17 are continued upwardly at an angle across the outer sides of the side bars 5 of the frames 6 and have the extremities of their ends secured to the outer edges of said side bars to form guide loops 18 with which the side bars of the braces 13 are loosely engaged, said loops guiding and holding the braces in position for engaging the notches therein with the ends of the latch member as shown.

In addition to the braces 13, I also provide means whereby the supporting frames may be manually held up in an operative position for supporting the net should either of the braces become broken. The means for manually holding the frames in an operative position comprise cables or guy ropes 19, the inner ends of which are branched and suitably secured to the upper cross bar of the frames while the outer ends of the cables are of sufficient length to permit the same to be grasped and held by a number of firemen or other persons whereby the frames are held up to support the net in a properly stretched condition. It will be noted that the inner ends of the opposite side bars of the braces are connected to the same supporting bar or rod at points adjacent to each other and that said side bars when thus connected practically push against each other, and thereby form rigid braces for the supporting frames of the net. By providing a series of notches in the side bars of the braces the net supporting frames may be adjusted to compensate for any stretching of the net, thus enabling the frames to hold the net at the proper tension.

When the apparatus is not in use the braces are disengaged from the latch member, and the supporting frames folded downwardly and inwardly onto the platform. When in this position the net may be wound upon its loose supporting roller or may be permitted to fold loosely onto the platform beneath the supporting frames. When the parts are folded in this manner the vehicle may be employed for carrying other apparatus and firemen to fires.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

1. A life saving apparatus of the character described comprising a platform, net supporting frames hingedly secured to said platform and adapted to be swung to operative and inoperative positions, a net secured to said frames and adapted to be stretched and held in an operative position by said frames, frame supporting braces pivotally secured at their inner ends to said platform and adapted to embrace said frames, a latch member secured to said frames, and means on said braces to engage said stop bars whereby the frames are adjustably held in position to support said net.

2. A life saving apparatus comprising a platform, net supporting frames hingedly secured to said platform, a net secured at its ends to said frames, latch members arranged across the inner sides of said frames, said members having their ends extended and bent upwardly and inwardly adjacent to the sides of the frames to form guides, a brace attaching bar secured across said platform and having its ends projecting a short distance beyond the sides of the platform, bale shaped braces adapted to embrace said net supporting frames, said braces having their side bars slidably engaged with the guides formed on the ends of said latch members, said side bars having therein series of notches whereby said braces are engaged with the ends of the stop bars to adjustably support said net holding frames in operative positions.

3. A life saving apparatus comprising a wheeled truck, a platform arranged thereon, net supporting frames hingedly secured to said platform, a net connected at its ends to said frames, a brace attaching rod secured to the platform, braces pivotally connected at their inner ends to the ends of said cross bar, means whereby said braces are adjustably engaged with said frames to hold the latter in position for supporting said net, and cables connected to said frames whereby the latter may be held in operative positions to support the net should said braces become broken.

In testimony whereof I have hereunto set my hand in presence of two subscribing witnesses.

AUGUSTUS GREEN.

Witnesses:
A. H. MILLER,
C. C. GRIFFIN.

Copies of this patent may be obtained for five cents each, by addressing the "Commissioner of Patents, Washington, D. C."